United States Patent [19]

Yamada et al.

[11] Patent Number: 4,638,326

[45] Date of Patent: Jan. 20, 1987

[54] INK JET RECORDING APPARATUS

[75] Inventors: Takahiro Yamada, Ibaraki; Satoshi Namekawa, Hitachi; Eiji Yoshino, Hitachi; Yasumasa Matsuda, Hitachi, all of Japan

[73] Assignees: Hitachi, Ltd.; Hitachi Seiko Ltd.; Hitachi Koki Co., Ltd., all of Tokyo, Japan

[21] Appl. No.: 834,813

[22] Filed: Feb. 28, 1986

[51] Int. Cl.[4] .............................................. G01D 18/00
[52] U.S. Cl. ........................................................ 346/75
[58] Field of Search ........................................... 346/75

[56] References Cited

U.S. PATENT DOCUMENTS

| | | | |
|---|---|---|---|
| 4,016,571 | 4/1977 | Yamada | 346/75 |
| 4,050,077 | 9/1977 | Yamada et al. | 346/75 |
| 4,368,474 | 1/1983 | Togawa et al. | 346/75 |
| 4,524,366 | 6/1985 | Yamada | 346/75 |

*Primary Examiner*—E. A. Goldberg
*Assistant Examiner*—Gerald E. Preston
*Attorney, Agent, or Firm*—Antonelli, Terry & Wands

[57] ABSTRACT

While the excitation voltage of an ink jet nozzle is swept on the logarithmic scale, the generation state of ink droplets at a phase $\theta_k$ is examined. An excitation voltage value Vn generating an ink droplet of small diameter at the phase $\theta_k$, an excitation voltage value Vn generating an ink droplet of large diameter at the phase $\theta_k$, which is lower than vn, and an excitation voltage value Vn+1 generating an ink droplet of large diameter at the phase $\theta_k$, which is higher than vn are stored. Difference values expressed as $$Wn = vn - Vn$$

$$wn = Vn - 1 - vn$$

are derived on the logarithmic scale. Then the nozzle excitation voltage is set at such a value as to generate ink droplets and minimize the value of $|Wn - wn|$.

2 Claims, 9 Drawing Figures

INK JET RECORDING APPARATUS

BACKGROUND OF THE INVENTION

1. Field of the Invention

The present invention relates to an ink jet recording apparatus, and in particular to the control of the ink droplets generation in an ink jet recording apparatus which alternately separates the leading edge of the columnar ink stream ejected from the nozzle into ink droplets of large diameter and small diameter and surely charges and deflects those ink droplets independently of each other to record images.

2. Description of the Related Art

An ink jet recording apparatus whereto the present invention is applied is the ink jet recording apparatus of the type as described in U.S. Pat. No. 4,050,077 by Takahiro Yamada and Tetsuo Doi. In such an ink jet recording apparatus, ink droplets of large diameter and ink droplets of small diameter are alternately generated, and these droplets are charged and deflected according to recording signals to control the impingement of the ink droplets against the recording sheet.

In order to attain the favorable recording at all times even if the ambient temperature of the recording apparatus or the property of the ink is changed, such an ink jet recording apparatus must be provided with a device for automatically setting such a suitable excitation state of the nozzle that ink droplets of large diameter and ink droplets of small diameter are suitably generated at all times.

An example of such a device is described in U.S. Pat. No. 4,016,571 by Takahiro Yamada. In that device, the ink droplets are charged while the excitation voltage is changed. And the excitation voltage is set at such a value that ink droplets of small diameter are generated, charged and deflected to collide against a sensor. This device is advantageously simple when only the ink droplets of small diameter are used for recording in the recording apparatus to be constituted.

In this system, however, it was sometimes impossible to charge only the droplets of small diameter by the recording signals when the precision in setting the excitation voltage at an optimum value was increased. That is to say, adjacent ink droplets of large diameter were sometimes charged, causing errors in the charging amount and the flying path of the recording ink droplets. As a result, the recording quality was lowered.

Further, in a recording apparatus using ink droplets of large diameter as well as ink droplets of small diameter, ink droplets of small diameter are sometimes charged by the recording signals for charging the ink droplets of large diameter. Accordingly, ink droplets of small diameter are sometimes deflected largely, resulting in largely disturbed recording.

SUMMARY OF THE INVENTION

An object of the present invention is to provide an ink jet recording apparatus which is equipped with a device for automatically setting the production state of ink droplets at the optimum value at all times, which is able to surely control the charging of ink droplets of large diameter and ink droplets of small diameter by means of their respective recording signals, and which is able to favorably record information even if the ambient temperature of the recording apparatus or the property of the ink is changed.

The present invention relates to an ink jet recording apparatus wherein ink is introduced into an excited nozzle and separated at the nozzle alternately into ink droplets of large diameter and ink droplets of small diameter, and wherein those ink droplets are ejected toward a substance to be recorded thereon and are charged and deflected according to record signals so as to impinge against predetermined positions of the recording medium. In accordance with the present invention, an ink jet recording apparatus includes a record condition optimizing device for setting the excitation voltage of the nozzle optimumly to ensure the generation and charging of ink droplets. Further, in accordance with the present invention, the record condition optimizing device includes first means for sweeping the excitation voltage on the logarithmic scale, second means for successively detecting an excitation voltage value which causes an ink droplet of large diameter to be separated from the columnar ink stream and generated at a phase $\theta_k$, and an excitation voltage value which causes an ink droplet of small diameter to be separated from the columnar ink stream and generated at the phase $\theta_k$, and third means for, on the basis of the results detected by the second means, calculating a space Wn on the logarithmic scale between an excitation voltage value Vn generating an ink droplet of small diameter and an excitation voltage value Vn generating an ink droplet of large diameter which is adajacent to and lower than the excitation voltage value vn, calculating a space wn on the logarithmic scale between the excitation voltage value vn generating an ink droplet of small diameter and an excitation voltage value Vn+1 generating an ink droplet of large diameter which is adjacent to and higher than the excitation voltage value vn, calculating the value of |Wn−wn|, and setting the excitation voltage so as to minimize the value of |Wn−wn|.

The present invention will be further described supplementally.

An ink jet recording apparatus according to the present invention includes a record condition optimizing device for properly setting the ink droplet generating state as follows.

The record condition optimizing device sweeps the excitation voltage value of the nozzle on the logarithmic scale and successively measures the voltage values causing ink droplets of large diameter and ink droplets of small diameter to be separated from the columnar ink stream at the phase $\theta_k$. The device calculates a space Wn between an excitation voltage value vn generating an ink droplet of small diameter and an excitation voltage value Vn generating an ink droplet of large diameter which is adjacent to and lower than the excitation voltage value vn. The device also calculates a space wn between the excitation voltage value vn generating an ink droplet of small diameter and an excitation voltage value Vn+1 generating an ink droplet of large diameter which is adjacent to and higher than the excitation voltage value vn. Further, the record condition optimizing device calculates the value of |Wn−wn| and sets the excitation voltage at such a value as to minimize the value of |Wn−wn|.

In actual operation, the sweeping excitation voltage with the logarithmic scale may be compensatated in some part of the sweeping scale in consideration of the shape of nozzle or distortion of excitation voltage. Therefore, the comensated part is not completely coincide with the logarithmic scale. However, such compensation is depend on the actual cases. In this descriptions, the meaning of the term logarithmic scale includes substantial logarithmic scale at the case of voltage compensation.

DESCRIPTION OF THE PREFERRED EMBODIMENTS

Figure 1:
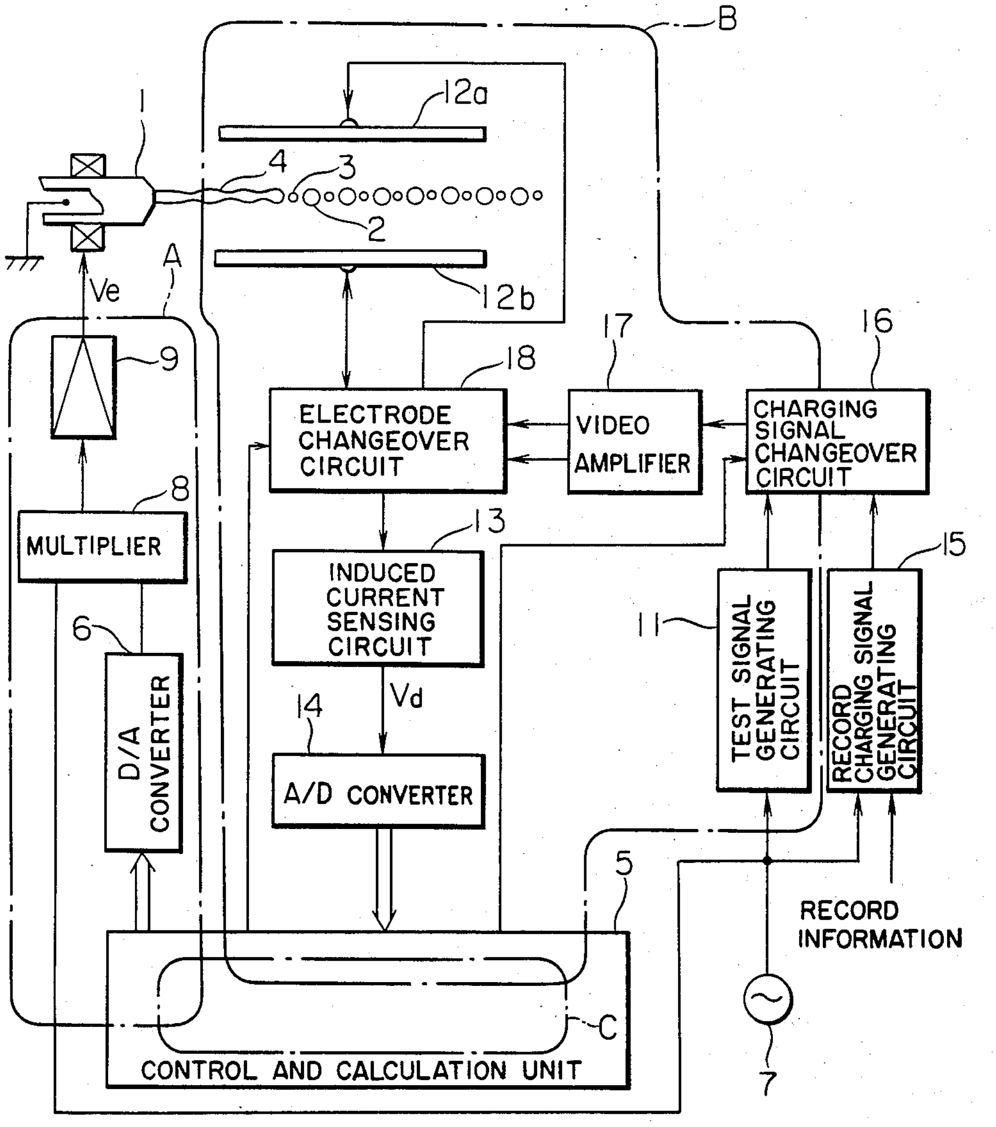
FIG. 1 is a block diagram of an embodiment of an ink jet recording apparatus according to the present invention.

In FIG. 1, a nozzle 1, an ink droplet of large diameter 2, an ink droplet of small diameter 3, a columnar ink stream 4, a control and calculation unit 5, a D/A converter 6, a sine wave exciter 7, a multiplier 8, an excitation amplifier 9, a test signal generating circuit 11, control electrodes **12*a* and 12*b*, an induced current sensing circuit 13, an A/D converter 14, a record charging signal generating circuit 15, a charging signal changeover circuit 16, a video amplifier 17, and an electrode changeover circuit 18** are shown. Blocks A, B and C represent variable excitation voltage means, ink droplet generating voltage measuring means, and optimum excitation voltage value determining means, respectively.

That is to say, the record condition optimizing device in this embodiment includes variable excitation voltage means A which is the first means for sweeping on the logarithmic scale the value of the excitation voltage applied to the nozzle 1 having a piezoelectric device attached thereto, ink droplet generating voltage measuring means B which is the second means for successively measuring excitation voltage values which cause an ink droplet of large diameter 2 and an ink droplet of small diameter 3 alternately separated from the columnar ink stream 4 to have a phase $\theta_k$, and optimum excitation voltage value determining means C which is the third means for, on the basis of the results measured by the second means, carrying out calculation and judgment to find the optimum excitation voltage value and set the excitation voltage at its optimum value. The partition of the ink jet apparatus into these blocks is illustrated in FIG. 1.

The operation of the ink jet apparatus of FIG. 1 will now be described by referring to a flow chart of FIG. 2 as well as FIGS. 3 to 6.

Figure 3:
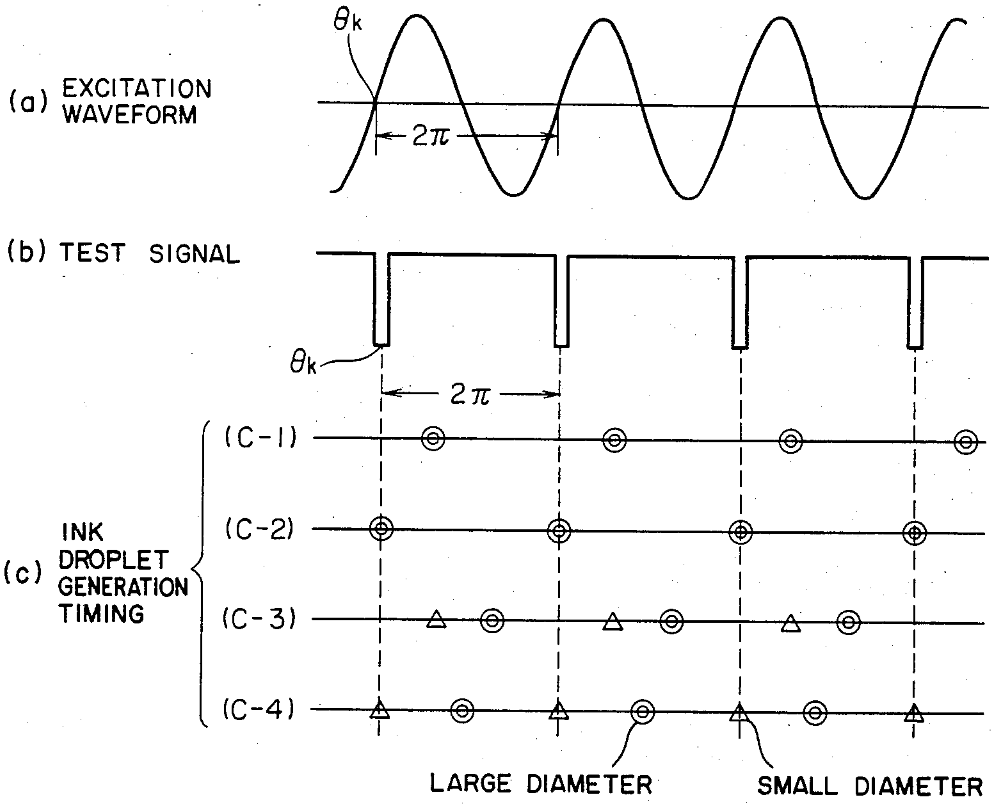
FIG. 3 is a time chart for illustrating the generation of ink droplets.

In step 201, the control and calculation unit 5 makes the test signal generating circuit 11 produce a test signal (b) shown in FIG. 3 having a narrow width and phase $\theta_k$ which is in fixed relation with respect to the phase of the excitation waveform (excitation voltage waveform) (a). The test signal (b) is applied to the control electrode **12*a* via the charging signal changeover circuit 16, video amplifier 17, and electrode changeover circuit 18. In step 202, the excitation voltage Ve for exciting the nozzle 1 is initialized to the minimum value Vemin over the sweep range. This initialization is carried out by supplying the command value from the control and calculation unit 5 composed of a microcomputer to the D/A converter 6 and by multiplying the command value with the sine wave supplied from the sine wave exciter 7 in the multiplier 8. In step 203, it is checked whether an ink droplet is generated or not at the phase $\theta_k$ by referring to the output of the A/D converter 14. If an ink droplet is not generated, the excitation voltage Ve is changed by a predetermined amount, and the processing in step 203 is carried out again. If the generation of an ink droplet is detected in step 203, it is checked whether the ink droplet is an ink droplet of small diameter or not in step 205**.

FIG. 3(*c*) shows the ink droplet generation timing. At positions represented by symbols ◎, ink droplets of large diameter are separated from the columnar ink stream to be generated. At positions represented by symbols Δ, ink droplets of small diameter are separated from the columnar ink stream to be generated. Lines (c-1) to (c-4) of FIG. 3 correspond to states of different excitation voltage values. The lines (c-1) to (c-4) represent the generation phases of ink droplets. States such as a state in which only ink droplets of large diameter are generated from the columnar ink stream, or a state in which both ink droplets of large diameter and ink droplets of small diameter are generated, are represented by the lines (c-1) to (c-4).

In response to the test signal (b), ink droplets of large diameter are generated in the ink droplet generation state (c-2), and ink droplets of small diameter are generated in the state (c-4).

Ink droplets are not charged in the state (c-1) or (c-3).

Because the amount of charging of an ink droplet is in proportion to the voltage applied to the control electrode when the droplet is separated from the columnar ink stream.

Since the phase $\theta_k$ of the test signal is constant, it is possible to examine the excitation voltage value generating an ink droplet at the phase $\theta_k$ by examining the charged state of the ink droplet.

In case of FIG. 3, ink droplets of large diameter are generated at the phase $\theta_k$ in the state (c-2), and ink droplets of small diameter are generated at the phase $\theta_k$ in the state (c-4).

As a device for detecting the charging state of an ink droplet for the above described purpose, a device disclosed in U.S. Pat. No. 4,524,366 by Takahiro Yamada can be used.

Figure 4:
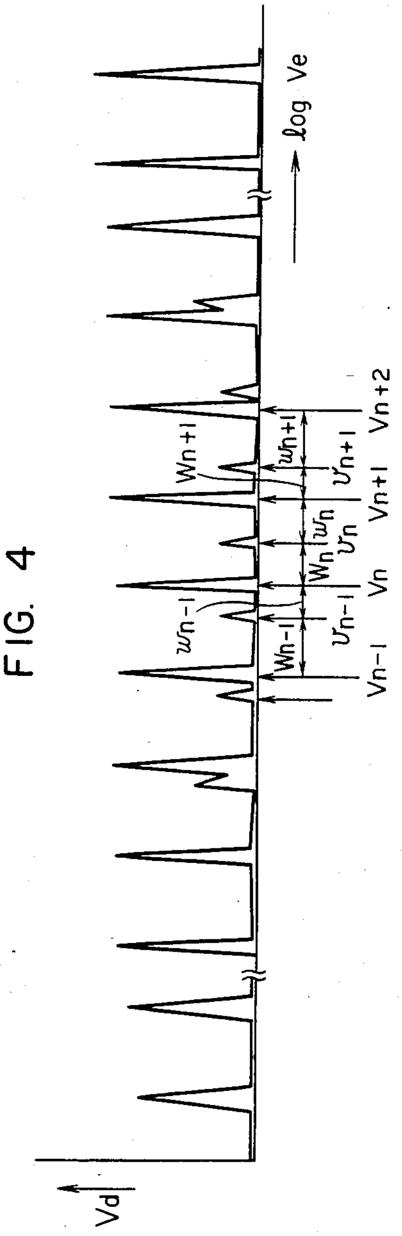
FIG. 4 is a diagram for illustrating the calculation of a value |Wn−wn|.

That is to say, a test signal corresponding to, say, approximately 30 periods of excitation is generated at certain excitation voltage value to charge ink droplets generated within the duration of the test signal. The ink droplet thus charged let flow an induced current between a control electrode corresponding to the control electrode of this embodiment and the ground. The current is sensed by a circuit corresponding to the induced current sense circuit 13 to be converted into a voltage value Vd as illustrated in FIG. 1. As shown in FIG. 4, the voltage value Vd can be detected with respect to the nozzle excitation voltage represented in logarithmic scale. From the detected value, a voltage value Vn for separating the ink droplet of large diameter from the columnar ink stream at the phase $\theta_k$ and a voltage value vn for separating the ink droplet of small diameter from the columnar ink stream at the phase $\theta_k$ can be obtained.

The output of the induced current sensing circuit 13 is supplied to the control and calculation unit 5 via the A/D converter 14. Thus, the excitation voltage value indicating the peak of the voltage value is detected together with the height of the peak to detect Vn and vn.

Figure 2:
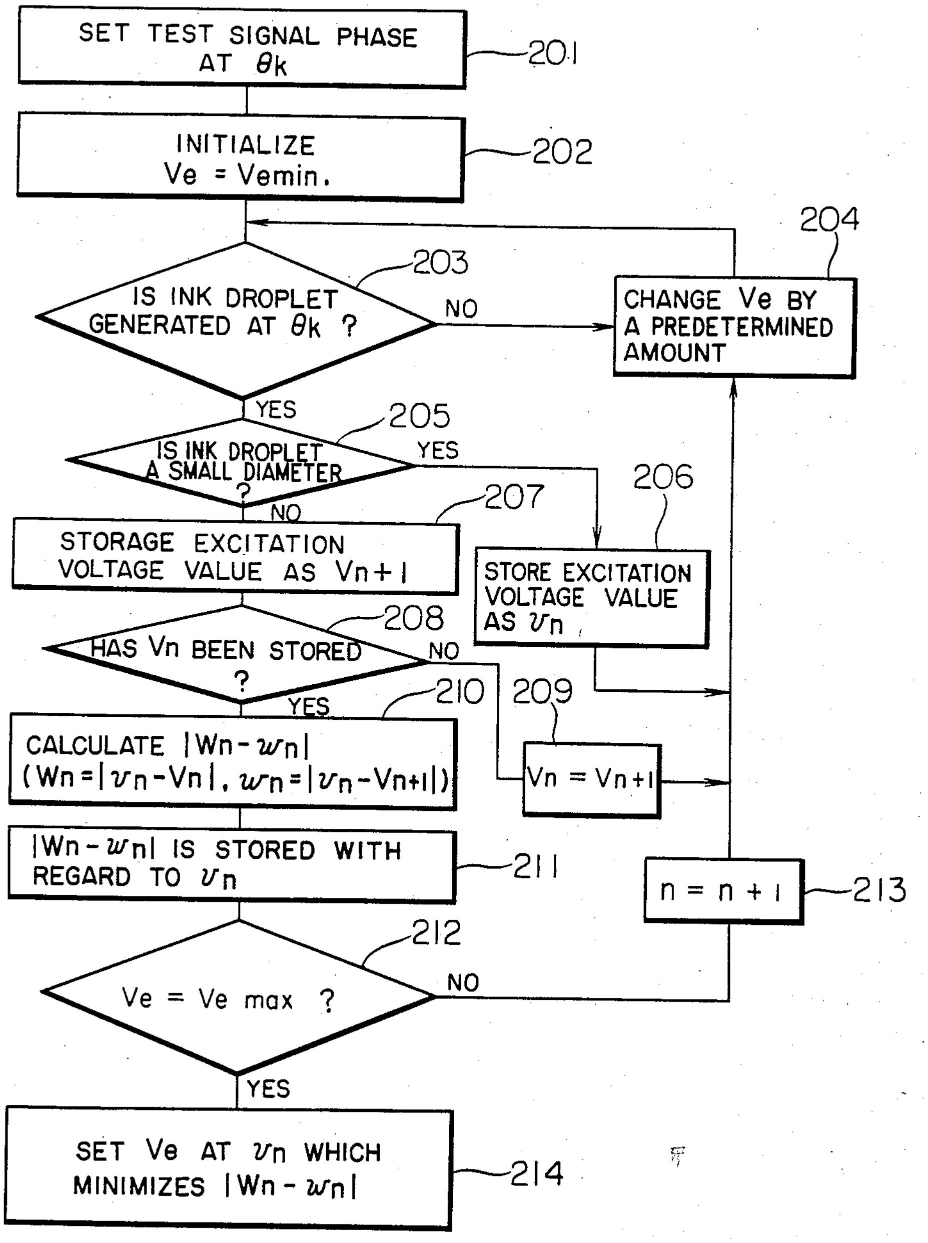
FIG. 2 is a flow chart for illustrating the operation of the apparatus shown in FIG. 1.

If the ink droplet is determined to be small diameter in step 205 of FIG. 2, the excitation voltage at that time is stored in the memory as vn, and the processing in the next step 204 is carried out. If the ink droplet is not small diameter (i.e., in case of an ink droplet of large diameter), the voltage at that time is stored in the memory as Vn+1 in step 207, and it is checked in step 208 whether Vn has already been stored. If Vn has not been stored, Vn is replaced by Vn+1 in step 209, and the processing in step 204 is carried out. If Vn has already been stored, the processing in step 210 is carried out as described below.

For example, Wn and wn as illustrated in FIG. 4 are derived. The symbol Wn represents the space between the n-th excitation voltage value vn generating an ink droplet of small diameter and an excitation voltage value Vn generating an ink droplet of large diameter which is adjacent to and lower than vn. The symbol wn represents the space between vn and the excitation voltage value Vn+1 generating an ink droplet of large diameter which is adjacent to and higher than vn. Subsequently, the value $|Wn-wn|$ is calculated. The calculated result $|Wn-wn|$ is stored with regard to vn in step 211.

The above described operation is carried out while the excitation voltage is changed on the logarithmic scale. Such processing is repeated through steps 212 and 213.

If the largest excitation voltage Vemax has been examined, such an excitation voltage value vn as to minimize $|Wn-wn|$ is found in step 214. The nozzle excitation voltage value is set at the value thus found. Thereby the difference $|\theta_L-\theta_S|$ between the generation phase $\theta_L$ of the ink droplet of large diameter and the generation phase $\theta_S$ of the ink droplet of small diameter approaches $\pi$, resulting in a sufficient phase difference.

Figure 5:
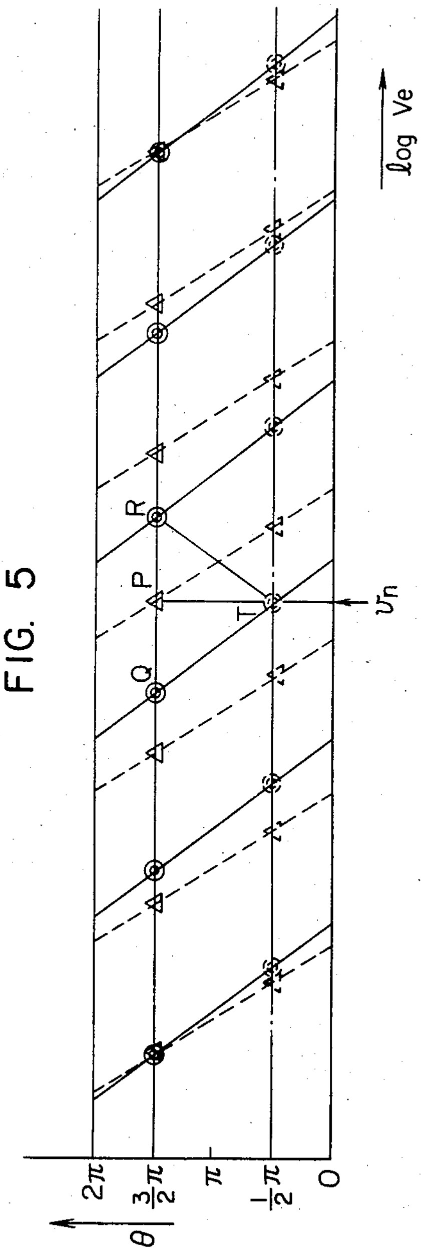
FIG. 5 is a diagram for illustrating the phase difference between generation of ink droplets of large diameter and generation of ink droplets of small diameter.

The reason can be understood with reference to FIG. 5.

The abscissa of FIG. 5 represents the excitation voltage in logarithmic scale and the ordinate represents the phase. The solid line represents the change of the phase at which an ink droplet of large diameter is generated. The broken line represents the change of the phase at which an ink droplet of small diameter is generated. As shown in FIG. 5, the generation phase of the ink droplets linearly varies with respect to the logarithm of the excitation voltage. Assuming now that $\theta_k=(3/2)\pi$, ink droplets of large diameter are generated at positions represented by symbols ◎, and ink droplets of small diameter are generated at positions represented by symbols Δ. Since the excitation voltage value and the phase are respectively set at vn and $\theta_k$ by the processing already described, a point P illustrated in FIG. 5 has been established.

The phase of $(\frac{1}{2})\pi$ which is apart by $\pi$ from the phase of $(3/2)\pi$ is obtained when ink droplets are generated at positions represented by symbols ◌ and ∴.

Positions at which ink droplets of large diameter are generated around the above described point P are referred to as points Q, R and T as shown in FIG. 5. The triangle QRT is an isosceles triangle having the base QR. Accordingly, the point P is located approximately at the middle point between the point Q and the point R. Therefore, points P and T are located approximately on the line of the excitation voltage vn. And the phase difference between points P and T is approximately $\pi$.

Figure 6:
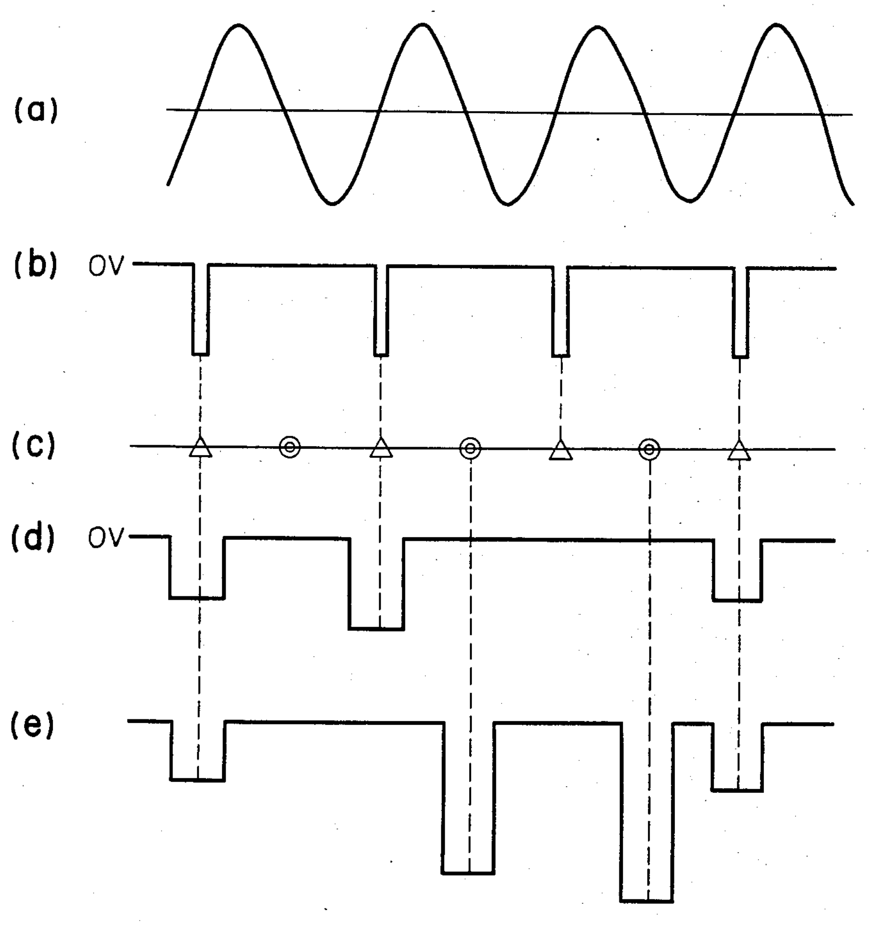
FIG. 6 is a diagram for illustrating the application of the recording signal voltage used to charge ink droplets.

For the excitation waveform (a), test signal (b), and generation timing of ink droplets (c) as shown in FIG. 6, the record charging signal generating circuit 15 sends out its signal with timing as shown in (d) or (e) of FIG. 6. When an ink droplet of large diameter is to be generated, therefore, the record signal voltage for charging the ink droplet of large diameter is surely applied to the control electrodes **12*a* and 12*b*. When an ink droplet of small diameter is to be generated, therefore, the record signal voltage for charging the ink droplet of small diameter is surely applied to the control electrodes 12*a* and 12*b***.

FIG. 6(*d*) shows the case where recording is carried out by using only ink droplets of small diameter, while FIG. 6(*e*) shows the case where recording is carried out by using both ink droplets of large diameter and ink droplets of small diameter.

Components of FIG. 1 will now be described further in detail. The charging signal changeover circuit 16 selects either the test signal or the record signal as the signal to be applied to the control electrodes **12*a* and 12*b*. The video amplifier 17 amplifies the charging signal. In the operation for record condition optimizing the electrode changeover circuit 18 connects the control electrode 12*a* to the video amplifier 17 to apply the test signal to the electrode 12*a* and connects the control electrode 12*b* to the induced current sensing circuit 13 to use the electrode 12*b* as the detection electrode for detecting the electric charge of the charged ink droplet. In recording operation, the electrode changeover circuit 18 connects both control electrodes 12*a* and 12*b* to the video amplifier 17** to apply the charging signal to those electrodes.

The above described operation of the record condition optimizing device is automatically carried out with sufficiently high frequency before the recording begins and while the recording apparatus is not conducting the recording operation.

Thereby the generation phase of ink droplets of large diameter can always be kept apart enough from the generation phase of ink droplets of small diameter. Therefore, it is possible to surely control ink droplets of large diameter and ink droplets of small diameter independently of each other.

In the embodiment heretofore described, the sweep range of excitation voltage is so set that the optimum excitation voltage value may be sufficiently located within the sweep range even if changes exist in ambient temperature, ink property, and nozzle excitation efficiency. And values of $|Wn-wn|$ are derived for all of the excitation voltage values within the sweep range from the minimum excitation voltage value Vemin to the maximum excitation voltage value Vemax. Then the excitation voltage value which minimizes the value of $|Wn-wn|$ is found.

Figure 7:
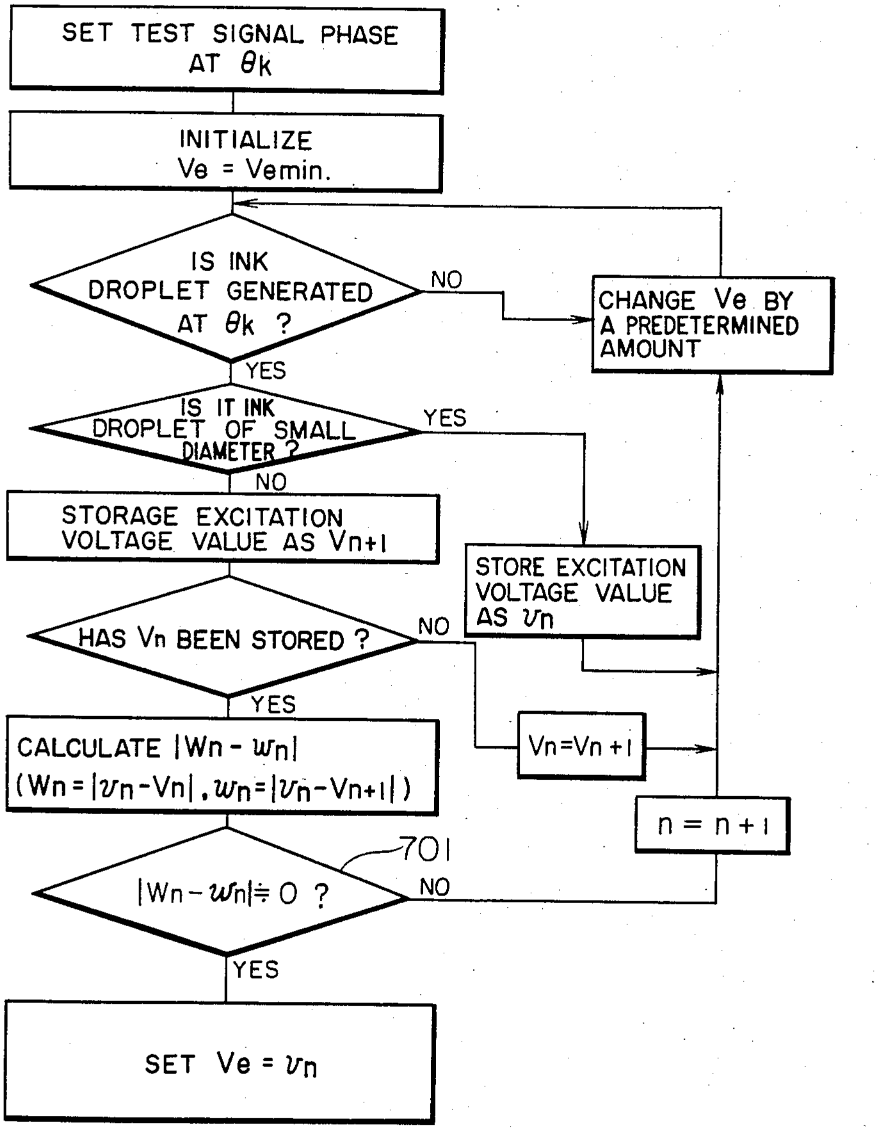
FIG. 7 is a flow chart for illustrating the operation of another embodiment of the present invention.

FIG. 7 shows a scheme according to another embodiment of the present invention.

As illustrated in the flow chart of FIG. 7, the value of $|Wn-Wn|$ is successively derived and it is judged whether it is close to zero or not. If the value is close to zero, the excitation voltage is fixed at its value at that time without being changed up to Vemax.

Another embodiment of a recording apparatus will now be described by referring to FIGS. 8 and 9.

Figure 8:
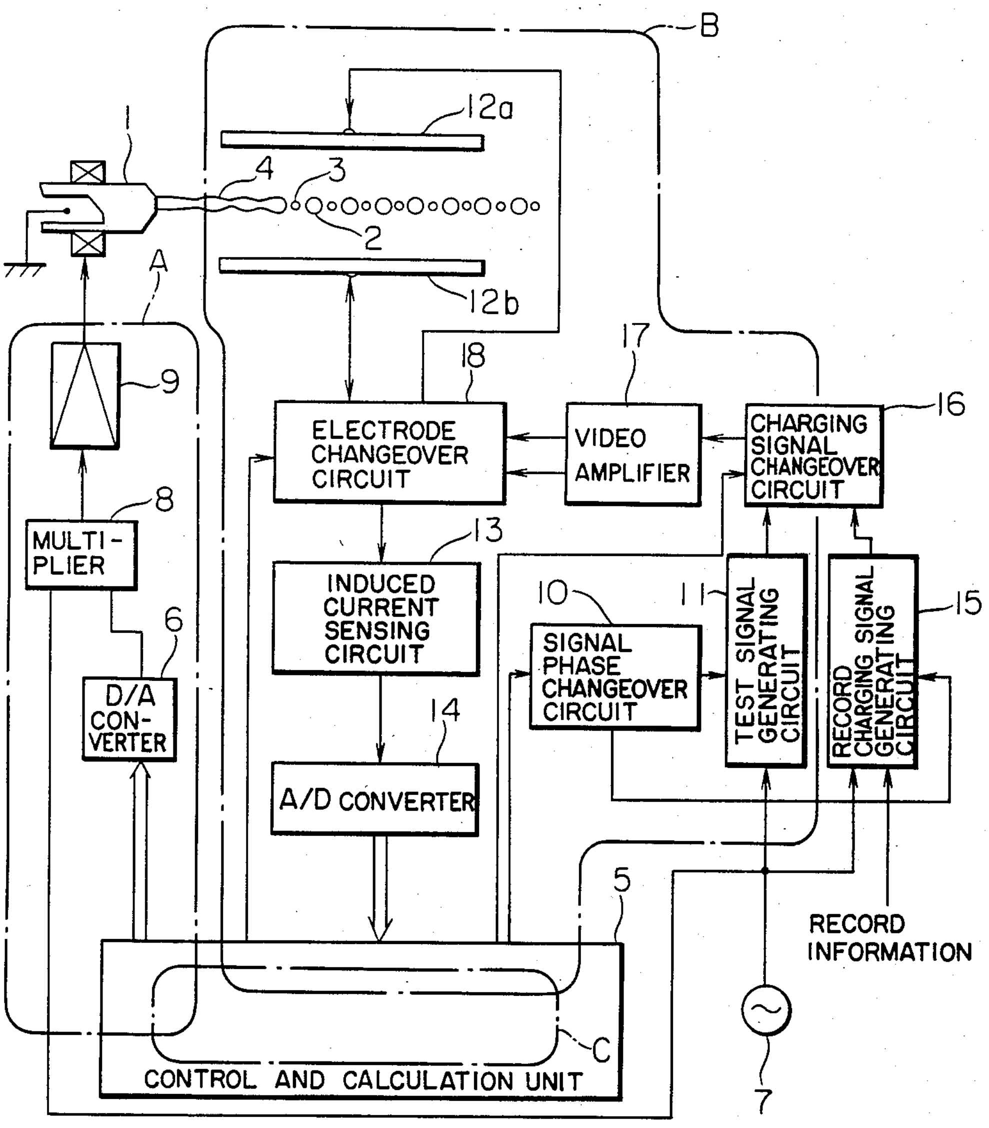
FIG. 8 is a block diagram of another embodiment of an ink jet recording apparatus according to the present invention.

In FIG. 8, identical reference numerals and symbols are employed to designate components corresponding to those of FIG. 1. Reference numeral 10 denotes a signal phase changeover circuit. The apparatus of FIG. 8 differs from that of FIG. 1 in that the signal phase changeover circuit 10 is provided in the ink droplet generating voltage measuring circuit.

Figure 9:
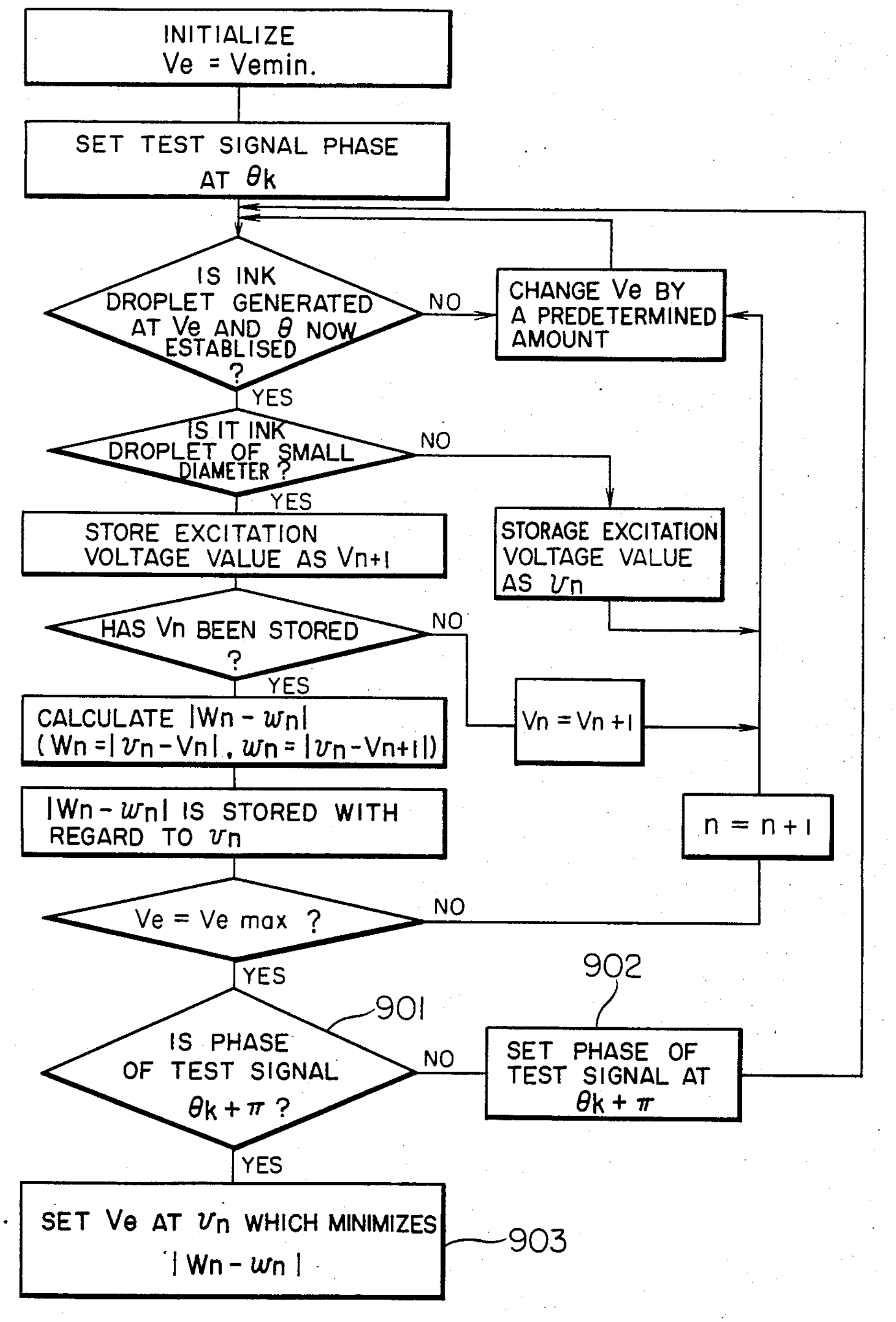
FIG. 9 is a flow chart for illustrating the operation of the apparatus shown in FIG. 8.

As illustrated in the flow chart of FIG. 9, the signal phase changeover circuit 10 is driven by a command supplied from the control and calculation unit 5. In steps 901 and 902, the phase relation between the phases of the test signal and the record signal and the phase of the excitation waveform is successively changed over between two phases spaced apart by $\pi$, i.e., the phase $\theta_k$ and $\theta_k+\pi$. At each of these phases, the above described operation is carried out. In step 903, the excitation voltage and phase are so set that the value $|Wn-wn|$ will be minimized. Thereby, it is possible to set $|Wn-wn|$ at a value closer to zero with high precision. This fact is understood also from the example illustrated in FIG. 5. In that case the excitation voltage can be set at a better value at phase $(3/2)\pi$ than at phase $(\frac{1}{2})\pi$.

It is sometimes desirable to examine the phase of the test signal at each of three phases $(\frac{2}{3})\pi$ apart. In most cases, however, two phases suffice.

According to the present invention, the generation state of ink droplets can always be set at the optimum value automatically as described above. Thus, it becomes possible to realize an ink jet recording apparatus which is able to surely control the changing of each of ink droplets of large diameter and ink droplets of small diameter by the recording signal, and which is always able to carry out favorable recording even if the ambient temperature of the recording apparatus and the property of the ink are changed.

We claim:

1. In an ink jet recording apparatus including:

a nozzle;

means for introducing ink into said nozzle and jetting said ink from the nozzle orifice;

means for exciting said nozzle so as to alternately separate the leading end of an columnar ink stream jetted from said nozzle into ink droplets of large diameter and ink droplets of small diameter and make those ink droplets fly toward the recording medium;

deflection control means for charging and deflecting the ink droplets according to the record signal so as to cause the ink droplets to impinge against said substance to be recorded thereon at predetermined positions thereof; and a record condition optimizing device for setting the optimum excitation voltage of said nozzle excitation means in order to ensure the generation and charging of the ink droplet, an ink jet recording apparatus wherein said record condition optimizing device comprises:

first means for sweeping the excitation voltage on the substantially logarithmic scale;

second means for successively detecting an excitation voltage value which causes an ink droplet of large diameter to be separated from the columnar ink stream and generated at a phase $\theta_k$, and an excitation voltage value which causes an ink droplet of small diameter to be separated from the columnar ink stream and generated at the phase $\theta_k$; and third means for, on the basis of the results detected by said second means, calculating a space Wn on the logarithmic scale between an excitation voltage value vn generating an ink droplet of small diameter and an excitation voltage value Vn generating an ink droplet of large diameter which is adjacent to and lower than said excitation voltage value vn, calculating a space wn on the logarithmic scale between said excitation voltage value vn generating an ink droplet of small diameter and an excitation voltage value Vn+1 generating an ink droplet of large diameter which is adjacent to and higher than said excitation voltage value vn, calculating the value of $|Wn-wn|$, and setting the excitation voltage at such a value as to minimize the value of $|Wn-wn|$.

2. An ink jet recording apparatus according to claim 1, wherein said first means includes a control and calculation unit, a D/A converter, a multiplier, and an excitation amplifier, wherein said second means includes a control and calculation unit, a test signal generating circuit, control electrodes, an induced current sensing circuit, an A/D converter, a charging signal changeover circuit, a video amplifier, and an electrode changeover circuit, and wherein said third means includes a control and calculation unit.

* * * * *